E. M. CRANDAL.
BARBED FENCE-WIRE.

No. 174,664. Patented March 14, 1876.

Witnesses:
L. A. Bunting
Heinrich F. Brues.

Inventor:
Edward M. Crandal
by L. L. Coburn

UNITED STATES PATENT OFFICE.

EDWARD M. CRANDAL, OF CHICAGO, ILLINOIS, ASSIGNOR OF ONE-HALF HIS RIGHT TO CHARLES M. KIRKHAM, OF SAME PLACE.

IMPROVEMENT IN BARBED FENCE-WIRES.

Specification forming part of Letters Patent No. 174,664, dated March 14, 1876; application filed October 16, 1875.

*To all whom it may concern:*

Be it known that I, EDWARD M. CRANDAL, of Chicago, in the county of Cook and State of Illinois, have invented an Improvement in Wire-Fences, of which the following is a specification, reference being had to the accompanying drawings, which form a part hereof.

My invention relates to that class of wire fence which is provided with brads or sharp points to prick the animal and protect the fence.

My invention consists in joining together short lengths of single wire by bending their ends and interlocking them in such a manner as to make a strong joint that will not be pulled apart by tightening the wire. The ends of the wire are sharpened and project laterally from the interlocked joint so as to form a brad to protect the fence.

Figure 1:
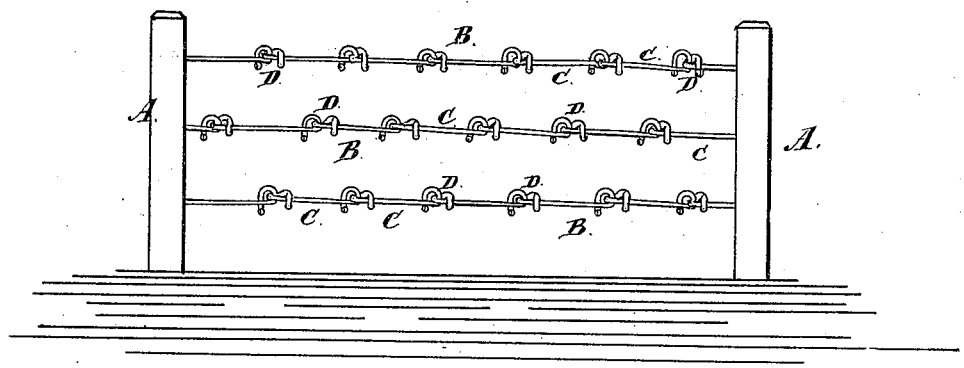
Figure 2:
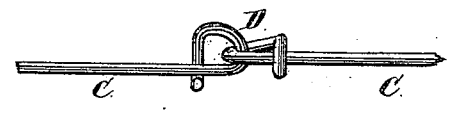

In the accompanying drawing, Figure 1 represents a side elevation of one length of fence with two posts. Fig. 2 represents a side elevation of one interlocking joint, and Fig. 3 a top view of said joint.

A A represent any ordinary fence-posts. B represents the length of wire extending from post to post, each length composed of several short pieces of wire, C, joined together by bending and interlocking them. There may be any desired number of lengths B of wire to constitute one length of fence, depending upon the height or character of the fence.

Figure 3:
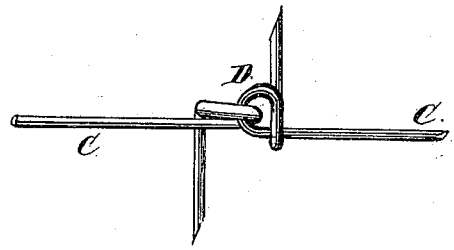

The interlocking joint which I make to join together the short wires C is clearly shown in Figs. 2 and 3. There is a loop made in each wire, through which the attaching wire is passed, and the end of each wire is bent so as to extend laterally from said loops, the end of one wire extending laterally in one direction, while the end of the other, interlocked with it, extends laterally in the opposite direction. D represents the interlocking joint.

I make a fence of short pieces of single wire, and by the interlocking joints D I make a long length of wire, B, so firmly joined together that it will stand the usual tightening. I also make from the ends of these short pieces the projecting sharp brads for protecting the fence.

This joint D, which I make for joining together the short pieces of wire enables me to fold the wire for transportation and dispense with the necessity of making reels, which are cumbersome and expensive to transport. I transport my wire in folded bundles.

I claim—

The single wire for a wire fence, composed of the single short pieces C, jointed together by the interlocking joints D, with their ends extending laterally in opposite directions, forming barbs, as specified and shown.

EDWARD M. CRANDAL.

Witnesses:
HEINRICH F. BRUNS,
L. A. BUNTING.